Feb. 12, 1952     A. R. BOLLAERT ET AL     2,585,366
LIGHTWEIGHT CONCRETE MIXTURE
Filed April 20, 1948
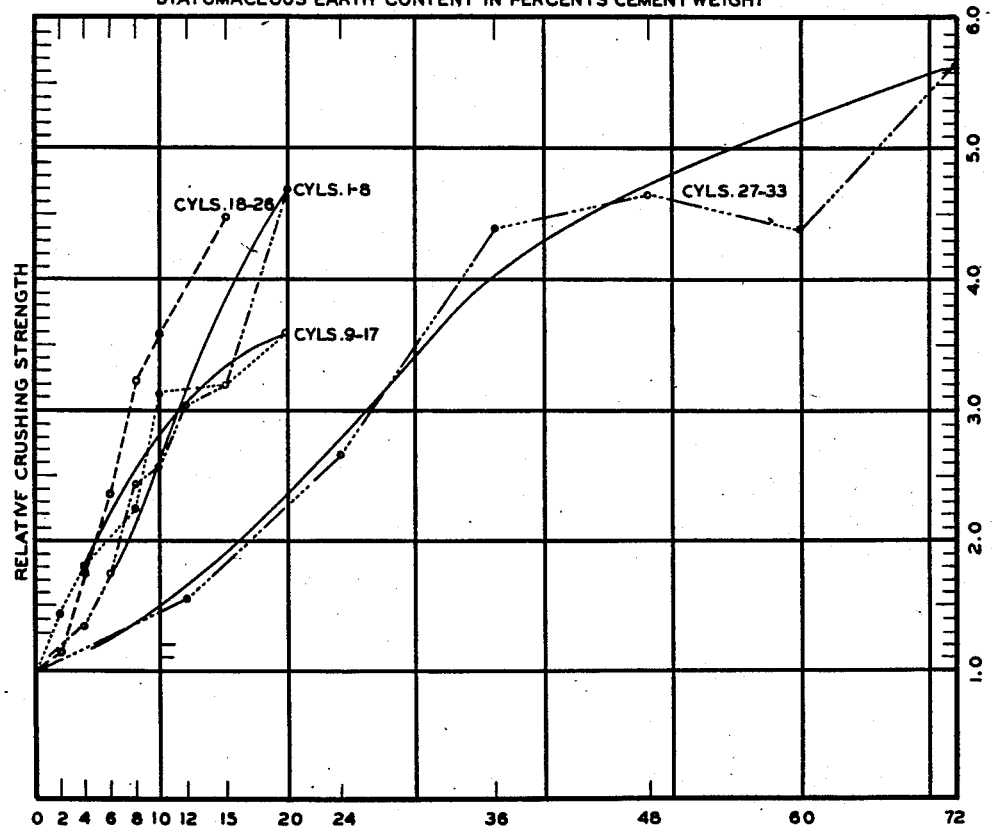
ARMAND R. BOLLAERT
ERNEST L. NEU
INVENTORS
ATTORNEY Patented Feb. 12, 1952

2,585,366

UNITED STATES PATENT OFFICE 2,585,366

LIGHTWEIGHT CONCRETE MIXTURE

Armand R. Bollaert, Arcadia, and Ernest L. Neu, Manhattan Beach, Calif., assignors to Great Lakes Carbon Corporation, Chicago, Ill., a corporation of Delaware Application April 20, 1948, Serial No. 22,096

4 Claims. (Cl. 106—98)

This invention relates to the production of concretes consisting in large part of cement and expanded perlitic materials, and specifically to a method of increasing the crushing strength of such concretes without materially increasing their weight.

The light weight aggregates on which the concretes herein described are based are the products of expansion and vesiculation of minerals of the perlitic type, a group of volcanic glasses including perlite, pitchstone, vitrophire and some varieties of obsidian. These minerals are characterized by a glassy or vitreous structure and by the presence of a small proportion, as for example from about 2% to about 6%, of combined water. Such varieties of volcanic ash as contain sufficient water of combination are also useful for this purpose and show the characteristic lustre under magnification.

The treatment of the mineral by which expansion is produced consists, in general terms, in crushing it to a desired particle size range and in heating the resultant granules to a temperature, of the order of 1700° to 2000° Fahr., at which the mineral becomes plastic and at which the combined water is evolved from the particle, producing a vesicular structure and a more or less extreme degree of increase in volume.

The product of this operation is a white or light colored granular mass, the loose weight of which may vary over an extreme range, as from fifty pounds to as little as two pounds per cubic foot, depending on the quality of the mineral (its adaptability to the expanding process) and the manipulation of the heat-treating step. For the purpose herein described we prefer to utilize a product having a loose weight, as packaged for shipment, within the range from twenty pounds to five pounds per cubic foot.

When examined under considerable magnification the product of the expansion of perlitic minerals is seen to be a mass of particles of three distinct types: vesicular grains consisting of numerous polygonal cells; individual spherical cells having thin glassy walls, and minute solid particles, mainly fragments of broken-down cell wall. In a carefully prepared product the vesicular grains make up the greater part of the total volume.

The cellular grains, whether vesicular or individual cells, may be separated from the solid particles by flotation, references hereinafter to "float percent" being to the percentage of the original volume which rises to form an upper, floating layer when the product is stirred with water and the suspension allowed to come to rest. The solid particles, which are usually of very small size, settle to form a clearly defined bottom layer, an intermediate layer of clear water appearing if the original suspension be sufficiently dilute.

Expanded perlitic minerals have been used somewhat extensively in the form of a Portland cement concrete for the fabrication of blocks, tile, slabs and other structural forms, and even for monolithic structures of small size. These concretes have the advantage of light weight but the resultant forms have, without any exception so far as we are aware, had too little compressive strength to carry any material load or stress. Whereas a rich cement-sand-rock concrete should show a 28 day strength of about 2800 pounds per square inch and a very lean concrete perhaps half that strength, the expanded perlite concretes heretofore made have shown a 28 day compressive strength of 250 to 300 pounds in a 1:5 mix, about 200 pounds in a 1:6.7 mix and not much over 100 pounds in a 1:10 mix. These low strengths unfit the straight perlite concrete for many uses to which such products are put and sharply limits its usefulness.

Another drawback to the perlite mortars heretofore produced is their tendency to stratify before setting. By reason of the extreme specific gravity difference between the cement and the expanded perlite, and the smooth surfaces and rounded contours of the perlite grains, there is a strong tendency to stratify and substantially no interlocking of grains to resist that tendency. In consequence, the separation of cement from aggregate becomes appreciable even when the aggregate is as heavy as forty pounds per cubic foot and is severe when a lighter aggregate, of the order of fifteen pounds per foot, is used. In the extreme case represented by the use of a low weight aggregate in a lean mix, the cement may separate almost completely from the aggregate during the agitation necessary for the filling of a mold or form, the upper portion of the resulting block being practically unbonded and the lower portion a layer of neat cement.

We have discovered that the tendency toward stratification may be overcome and the strength of a perlite concrete greatly increased by a relatively small addition of finely comminuted diatomaceous earth to the mix. The earth used for this purpose may be fluxed, calcined or natural, the latter type being preferred, and should be of the fineness characterized in the trade as "filler grade," i. e., the air float collected in the manufacture of filter aids. The particle size range of this grade is ordinarily from about 1 to about 50 microns, with more or less 70 percent finer than 10 microns. In this respect there is considerable latitude, but in all cases the earth used should be very fine.

The surprising results following from the addition of even small proportions of diatomaceous earth to a cement-perlite concrete are shown in the following tables reciting yields, densities, water absorptions and 28 day strengths obtained in four sets of test cylinders in which the cement : perlite ratios were respectively 1:5; 1:5; 1:6.7 and 1:12 and in each of which the quantity of diatomaceous earth added was varied over a considerable range. The weights of the materials used in making these cylinders were as follows, all in pounds per cubic foot as packed for shipment:

| | Pounds |
|---|---|
| Portland cement | 94 |
| Expanded perlite, cylinders 1 to 8 | 15.5 |
| Expanded perlite, cylinders 9 to 17 | 12.9 |
| Expanded perlite, cylinders 18 to 26 | 15.6 |
| Expanded perlite, cylinders 27 to 32 | 13.5 |
| Diatomaceous earth, filler grade | 20 |

Table 1.—Screen tests and densities of perlite aggregates used

| | Cylinders 18 to 26 | | Cylinders 1 to 8 | |
|---|---|---|---|---|
| | Per cent | Lbs. c. f. | Per cent | Lbs. c. f. |
| Retained on #4 screen | 4.2 | 14.0 | 0.9 | |
| Through #4 on #8 | 16.5 | 14.5 | 8.6 | 16.4 |
| Through #8 on #16 | 25.0 | 13.3 | 20.1 | 12.6 |
| Through #16 on #30 | 24.6 | 11.2 | 27.3 | 12.2 |
| Through #30 on #50 | 16.0 | 12.5 | 21.5 | 12.8 |
| Through #50 on #100 | 8.9 | 12.5 | 13.8 | 13.1 |
| Through #100 | 3.9 | 15.6 | 7.8 | 15.5 |
| Total | 100.0 | 15.6 | 100.0 | 15.5 |
| Fineness modulus | 3.24 | | 2.68 | |
| Float per cent | 94 | | 90 | |

Table 2

Mix Ratios—by volume, (C) 1: (P) 5.00: (W) 1.88: $DE^v$.
Mix Ratios—by weight, (C) 1: (P) 0.83: (W) 1.26: $DE^w$.

| Cylinder No. | 1 | 2 | 3 | 4 | 5 | 6 | 7 | 8 |
|---|---|---|---|---|---|---|---|---|
| Value of $DE^v$ | .000 | .188 | .282 | .376 | .470 | .564 | .705 | .940 |
| Value of $DE^w$ | .000 | .040 | .060 | 0.80 | .100 | .120 | .150 | .200 |
| Yield per cent total solids | 79.8 | 76.4 | 75.3 | 74.2 | 72.4 | 72.0 | 67.8 | 65.0 |
| Density #/c. f.: | | | | | | | | |
| 28 days | 40.5 | 42.8 | 45.0 | 43.4 | 43.7 | 44.0 | 43.2 | 45.5 |
| oven dry | 38.6 | 40.4 | 51.2 | 40.7 | 40.8 | 41.2 | 40.0 | 41.8 |
| Absorption¹ water—#/c. f. | 17.3 | 17.1 | 16.8 | 16.7 | 16.5 | 16.6 | 17.3 | 16.9 |
| Strength 28 days, lbs./sq. in. | 263 | 354 | 460 | 637 | 672 | 796 | 849 | 1238 |
| Strength ratio | 1 | 1.35 | 1.75 | 2.42 | 2.55 | 3.03 | 3.19 | 4.71 |

¹ = 24 hour total immersion.

Table 3

Mix Ratios—by volume, 1: 5.00: $W^v$: $DE^v$
Mix Ratios—by weight, 1: 0.69: $W^w$: $DE^w$.

| Cylinder No. | 9 | 10 | 11 | 12 | 13 | 14 | 15 | 16 | 17 |
|---|---|---|---|---|---|---|---|---|---|
| Value $W^v$ | 1.43 | 1.45 | 1.50 | 1.53 | 1.52 | 1.59 | 1.61 | 1.72 | 1.79 |
| Value $W^w$ | 0.95 | 0.97 | 1.01 | 1.03 | 1.02 | 1.07 | 1.08 | 1.15 | 1.20 |
| Value $DE^v$ | .000 | .094 | .188 | .282 | .376 | .470 | .564 | .705 | .940 |
| Value $DE^w$ | .000 | .020 | .040 | .060 | .080 | .100 | .120 | .150 | .200 |
| Yield percent total solids | 85.5 | 84.5 | 83.1 | 81.7 | 78.9 | 78.1 | 76.5 | 73.2 | 70.5 |
| Density #/c. f. | | | | | | | | | |
| 28 days | 37.1 | 37.4 | 48.4 | 37.5 | 38.8 | 40.3 | 40.4 | 40.2 | 40.5 |
| oven dry | 36.1 | 35.4 | 36.4 | 35.7 | 37.2 | 38.1 | 38.1 | 38.1 | 38.5 |
| Absorption water—#/c. f. | 13.3 | 13.9 | 13.6 | 14.1 | 13.9 | 14.4 | 14.5 | 15.0 | 15.6 |
| Strength 28 ds lbs./sq. in. | 284 | 407 | 513 | 424 | 637 | 884 | 867 | 902 | 1043 |
| Strength ratio | 1 | 1.43 | 1.80 | | 2.24 | 3.11 | | 3.18 | 3.60 |

Table 4

Mix Ratios—by volume, 1: 6.70: 2.30: $DE^v$.
Mix Ratios—by weight, 1: 1.05: 1.54: $DE^w$.

| Cylinder No. | 18 | 19 | 20 | 21 | 22 | 23 | 24 | 25 | 26 |
|---|---|---|---|---|---|---|---|---|---|
| Value of $DE^v$ | .000 | .094 | .188 | .282 | .329 | .376 | .470 | .564 | .705 |
| Value of $DE^w$ | .000 | .020 | .040 | .060 | .070 | .080 | .100 | .120 | .150 |
| Yield percent total solids | 69.0 | 68.0 | 76.2 | 67.0 | 65.3 | 65.0 | 63.6 | 62.0 | 59.0 |
| Density #/c. f.: | | | | | | | | | |
| 28 days air | 42.0 | 41.7 | 42.1 | 43.5 | 43.3 | 44.0 | 43.3 | 45.1 | 44.8 |
| oven dry | 40.4 | 40.0 | 41.5 | 41.7 | 40.9 | 41.7 | 40.6 | 42.8 | 42.5 |
| Absorption water—#/c. f. | 18.7 | 18.2 | 18.2 | 18.2 | 19.0 | 17.2 | 17.7 | 18.2 | 17.3 |
| Strength 28 ds. lbs./sq. in. | 187 | 212 | 336 | 442 | 460 | 601 | 672 | 849 | 849 |
| Strength ratio | 1 | 1.13 | 1.79 | 2.36 | 2.46 | 3.21 | 3.60 | 4.54 | 4.54 |

Table 5

Mix Ratios—by volume, 1:12.00: $W^v$:$DE^v$.
Mix Ratios—by weight, 1:1.73: $W^w$:$DE^w$.

| Cylinder No. | 33 | 27 | 28 | 29 | 30 | 31 | 32 |
|---|---|---|---|---|---|---|---|
| Value $W^v$ | 3.57 | 3.76 | 3.90 | 3.73 | 3.83 | 4.15 | 4.35 |
| Value $W^w$ | 2.39 | 2.52 | 2.61 | 2.50 | 2.57 | 2.78 | 2.91 |
| Value $DE^v$ | 0.00 | 0.56 | 1.13 | 1.69 | 2.26 | 2.82 | 3.38 |
| Value $DE^w$ | 0.00 | 0.12 | 0.24 | 0.36 | 0.48 | 0.60 | 0.72 |
| Yield percent total solids | 87.2 | 81.0 | 78.5 | 72.2 | 68.0 | 66.1 | 62.4 |
| Density #/c. f.: | | | | | | | |
| 28 days air | 27.3 | 27.6 | 28.4 | 29.2 | 30.6 | 31.2 | 31.2 |
| oven dry | 26.7 | 26.7 | 27.7 | 28.2 | 29.9 | 30.0 | 30.0 |
| Absorption water—#/c. f. | 17.4 | 17.6 | 17.4 | 17.0 | 18.0 | 18.6 | 19.1 |
| Strength 28 ds. lbs./sq. in. | 106 | 177 | 283 | 460 | 495 | 460 | 601 |
| Strength ratio | 1 | 1.67 | 2.67 | 4.41 | 4.67 | 4.31 | 5.67 |

(C) = cement; (P) = expanded perlite; (W) = water; $DE^v$ = diatomaceous earth ratio by volume; $DE^w$ = diatomaceous earth ratio by weight; $W^v$ = ratio of water by volume; $W^w$ = ratio of water by weight.

The remarkable improvement in compressive strength produced by the addition of finely comminuted diatomaceous earth, in relatively small quantity, to a cement-perlite concrete is shown graphically in the attached drawing. These graphs show the relation between the strength of each cylinder described in Tables 2 to 5 inclusive with that of the corresponding cylinder to which no addition of diatomaceous earth was made (i. e., the "Strength ratio" figures in the last line of each table).

It will be noted that in the two 1:5 mixes the addition of a quantity of diatomaceous earth equal to 20% of the weight of cement multiplied the strength of the unblended cement-perlite concrete by 3.6 and 4.7 times; an addition of 15% to a 1:6.7 mix increased the strength by 4.5 times, while in the case of a very lean mix a much larger quantity of diatomaceous earth was required, a 24% addition increasing the strength only 1.67 times, the strength increasing smoothly up to a 5.67 ratio at a 72% addition.

These very striking increases in strength make it possible, by judicious additions of diatomaceous earth, to bring the strength of a cement-perlite concrete up close to that of a lean concrete based on heavy aggregate. An entirely new utility is thus imparted to these light weight concretes, which heretofore have been restricted to uses in which load was practically absent. It is believed that this result has not heretofore been even remotely approached.

This gain in strength is obtained without sacrifice of the other properties which make perlite concretes desirable. Thus, for example, the increase in weight of the dry block accompanying an addition of 20% of diatomaceous earth ranges from 1 pound to 3.5 pounds per cubic foot, or from 3% to about 9%. The water absorption is not materially affected, in most cases tending downwardly to about 20% addition and then rising slightly.

The cement-perlite concretes have valuable heat flow retarding properties, the K factor being of the order of 1.1 to 1.3 while that of concrete made with heavy aggregate is of the general order of 9 to 10 (in B. t. u. per hour per square foot per inch thickness per degree Fahr. temperature difference at 75° mean temperature). The addition of diatomaceous earth as above described slightly increases the resistance to heat flow, as illustrated in the following experiment in which 4″ slabs of 1:4 cement-perlite concrete were heated on one side under underwriters' test conditions for four hours. Under these conditions the difference between the temperature of the unheated side of the block and that of the ambient air was as follows:

| | °F. |
|---|---|
| Slab containing no diatomaceous earth | 125 |
| With addition of 5% diatomaceous earth | 108 |
| With addition of 10% diatomaceous earth | 101 |

Ordinarily, panels formed from cement-perlite concrete fail in the standard fire and hose stream test, while similar panels to which a small proportion of finely comminuted diatomaceous earth has been added withstand this test without difficulty. This improvement in the properties of the concrete makes it highly useful and valuable for partition walls and other uses in steel frame buildings in which its light weight results in a material saving in steel.

The reason for this enhanced resistance to the successive application of fire and water is not known with entire certainty, but is believed to be the release of calcium oxide at high temperature and its exothermic reaction with the perlite in the absence of any inhibitor. The added diatomaceous earth, being largely free silica and being in a highly reactive form, is able to combine with the free lime of the cement to form a stable calcium silicate, thus obviating this cause of failure.

The very considerable sound-proofing property inherent in the perlite-cement concretes is not reduced by the addition of diatomaceous earth and in some instances may even be increased by that addition.

The resistance to the normal tendency to stratify while being placed in the slab, block or structure which is imparted by the addition of diatomaceous earth is incapable of representation in figures, but is of great practical importance. This tendency, if not corrected, is likely to lead to serious weakness in the product, and the correction has heretofore involved the use of mixes much richer in cement than would otherwise have been required.

The limit proportions of finely comminuted diatomaceous earth which may be added to any cement-perlite concrete have not been determined definitely, and in any case will vary with the richness of the mix. As a generality, applicable to all mix ratios, the minimum addition will be that which produces the desired or a useful increase in compressive strength while the upper limit will be that at which the density of the concrete is increased more than is desired. As a guide to practice, and without limitation, we suggest as the most useful addition range from one-half pound to ten pounds of diatomaceous earth per cubic foot of expanded perlite aggregate in the concrete mix, the most generally useful proportion being of the order of about one pound earth per cubic foot aggregate.

The diatomaceous earth used for this purpose must be finely comminuted, preferably to such fineness that the major part of the component particles are smaller than 50 microns. No claim is made to concretes based on or containing diatomaceous earth crushed to relatively large particles and lumps, in which the earth constitutes the principal part or all of the aggregate. Such concretes, which are well known, have properties and uses entirely distinct from those of the modified perlite concretes described herein.

It is possible to substitute other finely divided siliceous materials for diatomaceous earth in the above described compositions, though with results not entirely equivalent as regards increase in strength and as regards density of the product. For example we may use volcanic tuff or cinders, blast furnace slag, "fly ash," spent siliceous cracking catalysts and precipitated silicas, all in a state of extremely fine subdivision. It should be understood, however, that these substances are substitutes rather than equivalents for diatomaceous earth for this purpose, lacking the high relation of bulk to weight and the unique plate-like or spicular structure which make diatomaceous earth particularly valuable for increasing strength without increasing weight.

The diatomaceous earth is added in proportion not substantially less than 2% nor more than 100% of the weight of cement in the concrete, and is generally within the range from 2% to 20% by weight of cement in the concrete.

The term "perlite aggregate" as used in the claims is intended to designate and to be restricted to the above described products of the heat expansion and vesiculation of previously comminuted perlite, obsidian, vitrophire, pitchstone, volcanic ash and other volcanic glasses adapted to such expansion and is not intended to include vesiculated clays or shales which have an entirely different physical structure.

We claim as our invention:

1. A lightweight concrete of improved crushing strength consisting essentially of Portland cement, cellular artificially heat expanded perlite aggregate having a bulk density of 5-20 lbs. per cu. ft., and from 2-100% by weight, based on said cement, of a finely comminuted solid consisting essentially of silica, the volumetric ratio of cement to aggregate being within the range of 1:5 to 1:12.

2. A lightweight concrete of improved crushing strength consisting essentially of Portland cement, cellular artificially heat expanded perlite aggregate having a bulk density of 5-20 lbs. per cu. ft., and from 2-100% by weight, based on said cement, of a finely comminuted solid consisting essentially of diatomaceous earth, the volumetric ratio of cement to aggregate being within the range of 1:5 to 1:12.

3. A concrete substantially as recited in claim 2 wherein said diatomaceous earth is substantially free from particles exceeding 50 microns in major dimension.

4. A concrete substantially as recited in claim 2 wherein the diatomaceous earth is within the range of 2-20% of the weight of cement in said concrete.

ARMAND R. BOLLAERT.
ERNEST L. NEU.

REFERENCES CITED

The following references are of record in the file of this patent:

UNITED STATES PATENTS

| Number | Name | Date |
|---|---|---|
| Re. 16,732 | Wig | Sept. 6, 1927 |
| 801,597 | Lane | Oct. 10, 1905 |
| 1,305,522 | Caven | June 3, 1919 |
| 1,715,977 | Bates | June 4, 1929 |

OTHER REFERENCES

Ralston: U. S. Dept. of Interior Information Circular #7364, August 1946.